Patented Jan. 5, 1926.

1,568,464

UNITED STATES PATENT OFFICE.

JAMES W. NEILL, OF PASADENA, CALIFORNIA, ASSIGNOR TO GORO MATSUKATA, OF TOKYO, JAPAN.

METHOD OF RECOVERING COPPER.

No Drawing.   Application filed April 20, 1925.   Serial No. 24,676.

*To all whom it may concern:*

Be it known that I, JAMES W. NEILL, a citizen of the United States, residing at Pasadena, in the county of Los Angeles, State of California, have invented certain new and useful Improvements in Methods of Recovering Copper; and I do hereby declare the following to be a full, clear, and exact description of the invention, such as will enable others skilled in the art to which it appertains to make and use the same.

This invention relates to the recovery of copper from materials containing it, and particularly to the separation of copper from solutions derived from the hydro-metallurgical treatment of copper-containing ores.

It is the object of the invention to provide a method of recovering copper in a simple, expedient and inexpensive way by facilitating the separation of copper from solutions and the subsequent treatment of the metal. While the method is designed primarily for the recovery of copper from ores, it may be used in treating copper-containing solutions which are derived from any source as, for example, mine waters in which a relatively small amount of copper is present in solution.

In the hydro-metallurgical treatment of copper ores the metal is usually dissolved in a suitable acid such as sulphuric or hydrochloric acid to provide a solution containing copper salts. The copper is separated from these solutions either by electrolysis as anode copper or by precipitation upon iron in the form of pig or scrap. The metallic copper so produced is melted in a suitable furnace or smelted to a copper matte, as the case may be, for the purpose of producing pig copper. Both of these operations are relatively costly.

The invention depends upon the chemical action which results in the deposition of copper from solution in the presence of iron with concurrent solution of the iron. The method costs much less to operate than electrolytic deposition in cells supplied with current because it avoids the necessity of providing and maintaining the cells and also the expense of the current. It also avoids the difficulties experienced in recovering copper from solutions by contact with pig or scrap iron and provides a material which can be treated more readily and economically by smelting or otherwise to recover the copper.

In carrying out the invention ores or other materials containing copper are treated with suitable solvents, preferably commercial acids such as sulphuric or hydrochloric acid, and the solution is separated from the ore or other copper-containing material in any usual or convenient way. The solution is then caused to contact with a precipitating agent consisting of a porous aggregate of coke having iron distributed intimately therein. The precipitating agent may be arranged as a bed so that the solution can be showered thereon and percolated therethrough. As the solution filters through the bed it contacts with the finely divided iron in the precipitating agent and the copper is precipitated from the solution and replaced by the iron which is dissolved. The copper thus remains in the coke and when sufficiently impregnated with copper the coke can be smelted in an ordinary cupola blast furnace with the addition of suitable fluxes to form a fluid slag with the siliceous or gangue materials. The resulting copper is withdrawn from the furnace and cast as pig copper.

The precipitating agent or precipitant is prepared by mixing a suitable iron-containing material, i. e., mineral sand or concentrates, crushed ores, flue dust or mixtures thereof with suitable proportions of a carbonaceous material such as coking coal. The iron-containing material should be prepared by roasting if sulphur is present in the raw material in any considerable quantity. Crushing of the coal and iron-containing material may be resorted to in case the material is not sufficiently divided to admit thorough mixing thereof with the carbon. The coal should be crushed preferably to pass a quarter inch mesh. The iron-containing material is usually much finer and may range from relatively coarse material to dust. Owing to the oxidizing nature of the metal of the iron-bearing content of the mixture, it is possible to use coal which does not produce satisfactory coke under ordinary treatment since the presence of the oxidizing constituents is found to facilitate coking.

The proportions of the constituents of the mixture may vary widely, depending upon the nature and characteristics thereof.

Desirable proportions have been found to range between twenty parts of iron-containing material and eighty parts of coal to seventy parts of iron-containing material to thirty parts of coal. The parts are taken by weight and the best proportions are determined by preliminary tests of the particular combinations and mixtures.

Thorough mixing of the constituents is accomplished in any usual manner as by passing it through a grinding or pulverizing mill or a revolving cylindrical barrel or other usual mixing machine. It is important that mixing should be reasonably complete so that a uniform product may be assured.

The mixture is charged into a coke oven preferably of the modern by-product type which is heated to the coking temperature by gases circulating in flues provided for that purpose in the walls of the retorts. The heating may be furnished by the escaping gases, augmented if necessary by other fuel gases. Provision should be made for regeneration of the heat as is usual in coke ovens.

It has been demonstrated that iron can be reduced readily from its oxide compounds when subjected to contact with carbonaceous materials in a gaseous reducing atmosphere at a temperature of from 800 to 1000° C. for a period of from one to two hours. This temperature is attained readily in the coke oven retorts by treating the mixture for substantially the period and at the temperatures mentioned. In such retorts the iron is brought into a metallic condition in a finely divided form intimately distributed through the coke.

When the reduction of the iron oxides is substantially completed and satisfactory coke has been produced, the charge is removed from the retorts by means of the usual pushers, or otherwise, and is quenched immediately by water to avoid loss of fuel value by combustion with the atmosphere. Other appropriate means for cooling the coke may be employed, but such cooling must take place under substantially non-oxidizing conditions in order to avoid combustion of the carbon of the coke and oxidation of the metallic iron therein.

The resulting cooled product, which may be called "iron-coke," is now ready for use for the recovery of copper or other metals from copper or other metal-bearing solutions. This "iron-coke" is similar in appearance to good metallurgical coke and is in the form of strong coherent lumps which resist abrasion and breakage in handling.

The "iron-coke" may be placed in suitable precipitating vats or vessels through which the solution containing copper or other metal is permitted to percolate as hereinbefore described for the purpose of replacing the iron content of the coke with the copper or other metal.

The method of recovering copper as described affords very considerable saving as compared with methods heretofore in use. The separation of copper by means of the electric current requires a large expenditure of money for plant and apparatus, and in addition there is a heavy power cost. Copper solutions frequently contain other metals such as arsenic which interfere seriously with the operation of the electrolytic cells. The precipitation of copper from its solutions by means of pig or scrap iron requires the exposure of large amounts of surface to the solution and consequently involves the utilization of considerable space. The cost of handling and of recovering the copper from the pig or scrap iron is very considerable. The use of sponge iron as a precipitant has also been suggested but this involves the expense of producing the sponge iron which includes the cost of considerable amounts of fuel which is consumed.

The present method involves none of the difficulties mentioned. Aside from the percolating tanks no apparatus is required except the coke ovens which must be used in any event to produce the coke for smelting operations. The fuel value of the coal is conserved in the coke ovens and utilized in smelting the metal so that there is no waste from this source. The expense of providing and operating electrolytic cells is avoided entirely and the presence of metal such as arsenic does not affect the operation. The cost of mechanical handling can also be reduced to a minimum because the necessary handling machinery is already available usually in the coke plant.

The product of the operation, consisting of coke with copper disseminated therein as the result of substitution of the iron in the copper solutions, is adapted admirably to subsequent treatment. It can be smelted readily in ordinary furnaces with or without the addition of other copper-bearing materials by the addition of a flux to form a slag with the siliceous or gangue material. Sufficient fuel is present in the coke to maintain the smelting operation, but additional fuel can be added if necessary without affecting the method.

Various changes may be made in the details of the operation without departing from the invention or sacrificing any of the advantages thereof.

I claim:—

1. A method of recovering copper including the step of causing a solution containing copper to contact with an aggregate consisting of coke having iron distributed intimately therein.

2. A method of recovering copper including the step of causing a solution containing copper to contact with a porous aggregate consisting of coke having iron distributed intimately therein.

3. A method of recovering copper including the step of causing a solution containing copper to contact with an aggregate consisting of coke having iron distributed intimately therein and smelting the resulting product containing coke and copper derived from the solution.

4. A method of recovering copper from ores and similar materials containing it, which comprises dissolving the copper in an acid solution, causing the solution to contact with an aggregate consisting of coke having iron distributed intimately therein and smelting the resulting product containing coke and copper derived from the solution.

In testimony whereof I affix my signature.

JAMES W. NEILL.